3,509,947
SEED PLANTER SHOE
David Garst, Coon Rapids, Iowa, assignor to Acra-Plant, Inc., Newton, Kans., a corporation of Kansas
Filed Aug. 7, 1967, Ser. No. 658,793
Int. Cl. A01b 39/20; A01c 5/06
U.S. Cl. 172—721                                                                  1 Claim

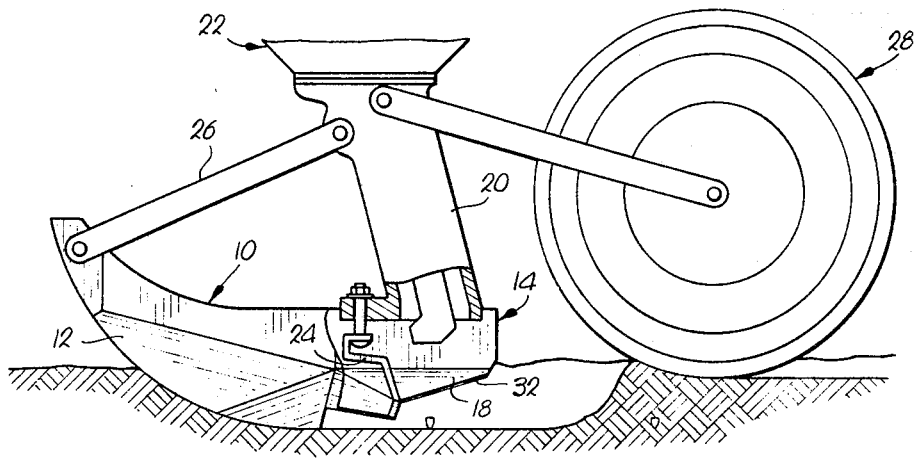
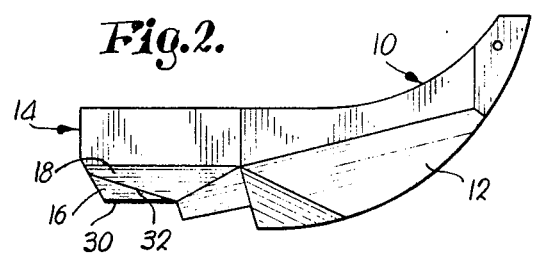
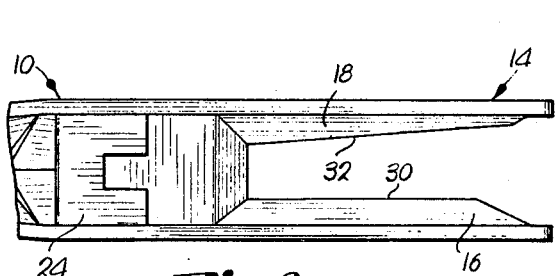
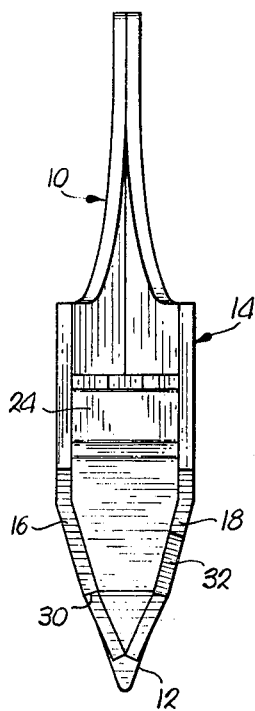
INVENTOR
David Garst

United States Patent Office 3,509,947
Patented May 5, 1970

ABSTRACT OF THE DISCLOSURE

A seed planter shoe having a groove maintainer behind the groove former and comprised of a pair of spaced-apart, elongated slides. The lowermost edge of one of the slides is generally horizontal and the lowermost edge of the other slide slopes upwardly and rearwardly whereby the edges diverge as the trailing ends of the slides are approached.

---

This invention relates to seed planter shoes and, more particularly, to a planter shoe having groove maintainers configured to resist becoming clogged.

Various kinds of planter shoes have been utilized for forming a seed-receiving groove in the soil. Conventionally, the planter shoes have a groove-forming part followed by structure adapted to hold the sides of the groove or furrow open while the seed is deposited therein. Ideally, the groove-forming part opens a slice in the surface of the ground and the groove maintainer portion of the shoe holds the flaps of the slice open sufficiently long to permit the seed to be deposited down into the slice whereupon the flaps are released for resilient movement into relatively firm embracing relationship with the seed.

Since the seed gravitates through a seed outlet between the groove maintainers, it is extremely important that the latter remain in clog-free condition throughout the planting operation. Should the space between the groove maintainers become clogged with clods or other material, the seed is prevented from gravitating into the groove and unseeded areas are left in the field.

Once the planting equipment has traversed the field, it is virtually impossible to discover precisely how much of the groove is unseeded so that replanting may be successfully carried out. This is particularly true since the clogging of the seed outlet is usually not detected until a discrepancy in the rate of depletion of the seed from the seed boxes carried by the planting equipment is noticed by the operator. Consequently, relatively large portions of the field may be inadvertently left unseeded resulting in a substantial lowering of the ultimate crop yield.

The susceptibility of the shoes to clogging is especially great since they normally are raised from the ground for turn around of the equipment at each end of the field. Any clods or other material present are apt to lodge between the bottom inside edges of the sides of the groove maintainer when the shoe is again set down upon the soil at the beginning of the planting of the next succeeding row.

Accordingly, it is the primary object of this invention to provide a seed planter shoe having a groove maintainer which is inherently resistive to clogging.

It is a further important object of the invention, in the achievement of the foregoing object, to provide a planter shoe groove maintainer which has lowermost edges diverging in directions which automatically conduct clods and other material along or between the edges away from the seed outlet.

These and other important objects of the invention will be further explained or will become apparent from the following description, claim and drawing.

In the drawing:

FIG. 1 is a fragmentary, elevational view of a seed planter illustrating a planter shoe embodying the principles of this invention in operative position in the soil, parts being broken away and shown in cross section to reveal details of construction;

FIG. 2 is a side elevational view of the planter shoe of FIG. 1;

FIG. 3 is a fragmentary top plan view of the shoe on a larger scale than FIG. 2;

FIG. 4 is a fragmentary, bottom plan view of the shoe; and

FIG. 5 is a rear end elevational view of the shoe.

The numerical 10 designates a seed planter shoe embodying the principles of this invention. Shoe 10 may be of any conventional configuration including the type described in U.S. Pat. No. 3,217,674, issued to D. E. Williams on Nov. 16, 1965, and entitled "Groove Forming, Seed Orienting Planter Shoe."

Shoe 10 comprises a groove-forming portion 12 and a groove maintainer 14 disposed at the trailing end of shoe 10. Maintainer 14 includes a pair of elongated slides 16 and 18 which are spaced apart to permit gravitation of seed through the maintainer 14 and into the bottom of the groove as illustrated in FIG. 1. Maintainer 14 is adapted to be secured to a tubular support 20 comprising a part of the seed planting equipment 22. Shoe 10 is provided with an irregularly-shaped bracket 24 which cooperates with an elongated bar 26 for securing shoe 10 to equipment 22. It is contemplated that a press wheel 28 carried by equipment 22 will follow in trailing relationship behind shoe 10 for compacting the soil as may be necessary following the planting operation.

The structure of this invention relates primarily to the configuration of maintainer 14. Thus, while the lowermost edge 30 of slide 16 extends generally horizontally, the corresponding lowermost edge 32 of the other slide 18 slopes upwardly and rearwardly to diverge from edge 30 as is most apparent in FIG. 3.

It will be noted that the respective slides 16 and 18 are transversely inclined and converge as their respective edges 30 and 32 are approached. Thus, the upward and rearward inclination of edge 32 causes the latter to diverge from edge 30 simultaneously in a pair of different directions as the trailing end of shoe 10 is approached.

The divergence of edges 30 and 32 rearwardly of the shoe 10 insures that any clods or similar material which would have a tendency to clog the seed outlet between the spaced-apart slides 16 and 18, will automatically become loosened upon forward movement of shoe 10. The vertical shifting of shoe 10 which occurs when the planting equipment is raised and lowered presents a particularly hazardous situation with respect to the clogging of planter shoes as heretofore described. Once clods or other material bridge the space between the slides 16 and 18, it would remain in place were it not for the relative divergence between the edges which are most likely to be the parts of the shoe which catch and hold such material. The tendency for the material to become dislodged is enhanced not only by the divergence of the edges, but also by the fact that the divergence is simultaneously in a pair of different directions. This permits the soil surrounding the groove throughout forward movement of the shoe to come into intimate contact with any material which would have a tendency to bridge the space between said edges and to effect dislodgment of such material.

It is to be pointed out that the beneficial effects obtained from construction of the seed planting shoe heretofore described do not detract in any substantial way from the ability of the slides 16 and 18 to provide their primary function of holding the sides or flaps of the groove formed by the part 12 apart until after the seed has gravitated down into the groove. The relatively small amount of material which is removed from slide 18 to provide the divergence of the edges 30 and 32 is not sufficiently great but what slide 18 adequately holds its corresponding side of the groove out of the way until the shoe traverses the adjacent soil.

Having thus described the invention, what is claimed as new and desired to be secured by Letters Patent is:

1. A seed planter shoe having a groove opener and a groove maintainer behind the opener, said maintainer comprising:
 a pair of elongated slides spaced apart for clearance of seeds gravitating into the groove and provided with generally longitudinal axes extending fore and aft along the normal path of travel of the shoe,
 said slides having downwardly-facing, longitudinal lowermost edges,
 one of said edges being generally horizontal with the other of said edges sloping upwardly and rearwardly, and said slides being transversely inclined so as to converge as their said edges are approached whereby said edges diverge as the trailing ends of the slides are approached for clearance of clods and other material from between the slides as they advance the forwardmost point of said sloping edge being positioned forwardly of the rearwardmost point of said horizontal edge.

References Cited

UNITED STATES PATENTS

| | | | |
|---|---|---|---|
| 1,824,233 | 9/1931 | Rector | 111—85 |
| 2,876,719 | 3/1959 | Holle | 111—85 X |
| 3,217,674 | 11/1965 | Williams | 111—86 |
| 3,251,325 | 5/1966 | Hyland et al. | 111—86 |
| 3,303,801 | 2/1967 | Reynolds | 111—86 |

ROBERT E. BAGWILL, Primary Examiner

A. E. KOPECKI, Assistant Examiner

U.S. Cl. X.R.

111—86